No. 723,362. PATENTED MAR. 24, 1903.
H. F. CAMPBELL.
PROCESS OF CONCENTRATING ORES.
APPLICATION FILED AUG. 16, 1902.
NO MODEL.
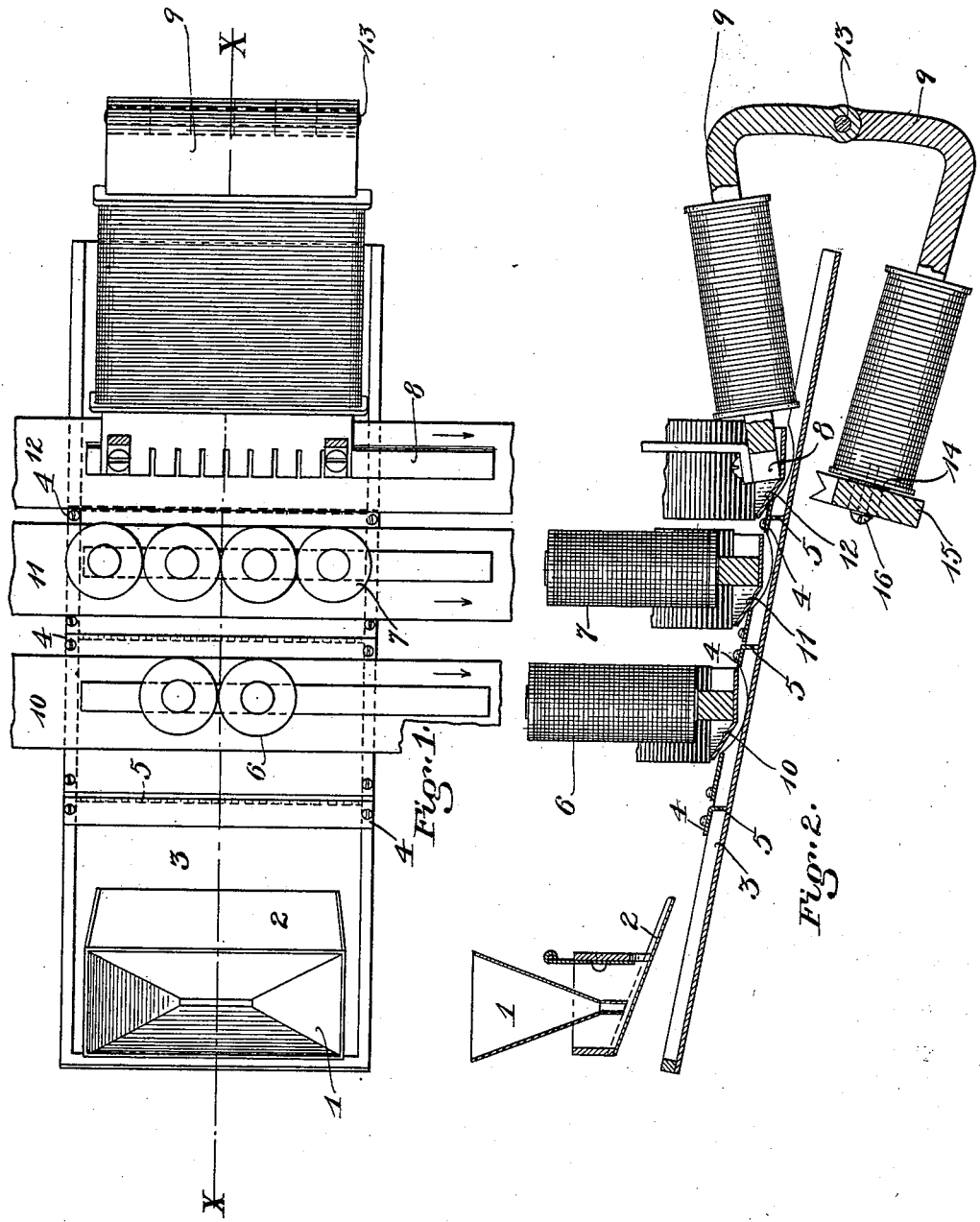
Witnesses:
Chas. F. Perkins.
A. G. Sullivan.
Inventor:
Henry F. Campbell.

UNITED STATES PATENT OFFICE.

HENRY F. CAMPBELL, OF MELROSE, MASSACHUSETTS.

PROCESS OF CONCENTRATING ORES.

SPECIFICATION forming part of Letters Patent No. 723,362, dated March 24, 1903.

Application filed August 16, 1902. Serial No. 119,861. (No specimens.)

*To all whom it may concern:*

Be it known that I, HENRY F. CAMPBELL, a citizen of the United States, residing at Melrose, in the county of Middlesex and State of Massachusetts, have invented a certain new and useful Process of Concentrating Ore, of which the following is a specification.

My invention relates to the art of concentrating ferruginous ore by magnetic separation of the values from the waste materials.

It consists, essentially, in the manner of heating the ore and in adapting the strength of the magnetic arc employed in the separating operation to correspond with the degree and duration of heat to which the ore is subjected.

My process is especially adapted for the treatment of ferruginous ore carrying gold, copper, and other values and containing zinc, silicates, and other so-called "non-magnetic" materials, by means of which I am able to remove from the ore substantially all the iron and the values with which it is combined, leaving in the residue the highest percentage of so-called "non-magnetic" materials."

Many attempts have been made to concentrate ferruginous and zinkiferous ores by magnetic separating-machines in which the ore was exposed to the action of a magnetic arc for the purpose of attracting and lifting the iron particles out of the mass of comminuted ore.

It is well known that non-magnetic iron sulfid may be rendered magnetic by subjecting it to heat for a considerable time. It has been a common practice to roast the ore for many hours in preparing it for treatment by a magnetic separator, and in all cases to heat or roast it sufficiently to remove a substantial part of the sulfur contained in the iron sulfid, occupying from thirty minutes to an hour, according to the degree of heat employed. While this treatment has the effect to magnetize the iron, the prolonged exposure to heat has an effect upon other constituents of the ore that is detrimental in the practice of the magnetic separating process.

I have discovered that in the magnetic separation of ores containing zinc, silicates, and other waste materials, if subjected to a high degree and long duration of heat, such as has been heretofore the practice, a large amount of the zinc, silicates, and waste will be lifted out by the magnets and mingled with the concentrates by reason of the prolonged heat imparting magnetic sensibility to such materials or to infinitesimal particles of some paramagnetic matter with which they are associated. I have discovered that when these materials are subjected to a brief red heat of but a few minutes, which is sufficient to magnetize the iron, they are not affected so as to be lifted out of the mass of ore by the magnets. My discoveries enable me to treat ores containing non-magnetic iron and copper pyrites, combined with zinc sulfids, silicates, and other waste materials, so as to remove all the iron from the mass that can be profitably taken out by magnetic attraction and to exclude essentially all the zinc, silicates, and other waste materials. In working zinkiferous ores I am thereby enabled to get a valuable zinc product, removing practically all the iron, and to get a valuable concentrate in the product lifted out by the magnets. The tendency of a prolonged heat also is to volatilize and dissipate some of the values, such as silver and lead, which can be removed with the iron and saved when the heating process is brief, as employed by me.

I have discovered that a very brief exposure to red heat, occupying but a few seconds, is sufficient in the case of many ores suitably to magnetize the iron sulfid and, contrary to the general belief, that it is not necessary to remove any appreciable amount of sulfur in order to magnetize the iron.

By exposure to such a low degree and brief duration of heat as I employ the silicates and other non-magnetics are affected so slightly that hardly an appreciable quantity will be attracted and removed by the magnets in a properly constructed and adjusted separating-machine, and there is scarcely any middlings or No. 2 product. In some ores the zinc, silicates, and other non-magnetics are sensitized to a greater extent than in others by the same degree and duration of heat; but in any ore the more prolonged is the exposure to a given heat within certain limitations the greater becomes the sensitiveness of those substances, and accordingly in the products of the separating process the concentrates are rendered more impure. I find, however, that this evil may be largely overcome by diminishing the strength of the magnetic arc employed in the separating process approximately in the same ratio as the degree and duration of heat have been prolonged in the preparatory treatment. Heretofore the efforts have been to produce a magnetic arc of great intensity under the belief that the greater the potential thereof the better would be the results in the products of the separating process.

The gist of my invention resides in the discoveries that the zinc, silicates, and other non-magnetic materials are sensitized to the influence of a magnetic field by the action of heat, that the sensitiveness is increased substantially in proportion as the exposure to heat is prolonged, and that to exclude the highest percentage of such materials from the concentrates in the products of the separating process and to attain the best results thereby the strength of the magnetic arc employed in the separating-machine must be less as the time of exposure of the ore to a given heat is prolonged.

Generally speaking, the chief object in the concentration of ore is to remove from the mass the highest percentage of iron and the values combined therewith and to exclude the highest percentage of the silicates and waste materials, and in zinkiferous ores to exclude also the highest percentage of zinc. An absolute separation of these constituents from each other is impossible; but it can be more nearly approximated in some ores than in others. Although in some cases essentially the entire iron content and its values might be removed by a given exposure to heat and employment of a given magnetic arc, it is not always advisable to do so, because the advantage gained in that direction is more than offset by the disadvantage of carrying with the values too large a percentage of zinc, silicates, and other so-called "non-magnetic" materials. Whether or not it is advisable depends upon the characteristics of the ore, which must be determined by experiment in each individual case. If the ore is of such a character that the concentrates are more valuable in spite of containing considerable waste material than they would be to contain less of the values and exclude a higher percentage of the waste, it is better to adapt the heat and magnetic arc to produce the former result; but it is otherwise if the impurity of the concentrates would be such that the increase in the cost of transportation and smelting would be greater than the additional value resulting from a purer concentrate. It is a relative question to be determined in each particular case. The desired object is to remove the largest percentage of iron and values from the mass that can be taken without sacrificing the net value of the concentrates by carrying too much of the zinc, silicates, and other waste materials. By an intelligent use of the process based upon my discoveries and herein described this object may be attained.

For separating the iron and values combined therewith from the other constituents of the ore I prefer to use the magnetic separating-machine invented by me and particularly described in my application for Letters Patent for "Apparatus for separating ore-pulp," filed May 16, 1901, Serial No. 60,433, for full details of the construction of which reference may be had to the specification and drawings of said application and of my application No. 60,432, filed May 16, 1901.

For the purpose of more clearly describing the manner of practicing the invention set forth herein reference is made to the drawings showing a portion of the machine described in said prior applications.

Figure 1 is a plan view of the table, magnets, and certain connecting parts. Fig. 2 is a vertical section of the parts shown in Fig. 1 through the line X X.

Like numerals of reference indicate corresponding parts in the figures of the drawings.

1 is a hopper, into which the comminuted ore is placed and from which it falls upon a stationary inclined chute or apron 2 and from there is discharged upon the inclined table 3, which is vibrated laterally by any suitable means, certain of which are set forth in my prior applications. The dry ore slides down the table 3 by gravity and by means of the vibratory motion thereof and the action of the distributers 4 is thinly spread over the same and kept in an active state. It is very desirable to have the particles of ore scattered over the table in a thin layer, so that the individual particles will be brought most directly under the influence of the magnets and with the least interference to their removal from the table. The ore passes under the electromagnets 6 and 7 and the upper pole 8 of the horseshoe-magnet 9. The tendency of the ore in descending over the table is to slide toward the center, and to obviate this I employ the distributers 4, having apertures 5 therein.

Belts 10, 11, and 12, made of duck or other suitable material, are carried by pulleys across the path of the ore on the table and in close proximity to the magnets 6 and 7 and the upper pole 8 of the magnet 9. The horseshoe-magnet 9 is made in two sections, which are hinged together at 13 for the purpose of adjusting the poles of the magnet at various distances from each other. The lower arm 14 of the magnet 9 is provided with an adjustable pole 15, secured to it by the bolt 16 and by means of which it may be adjusted at different distances from the under side of the table. The magnets preferably are connected together in series and of substantially the shape and cross-sectional area shown and described in my said prior application and are energized by a current which will produce by the magnet 6 a magnetic arc of about one-half ampere and by the magnet 7 a magnetic arc of about one ampere. The horseshoe-magnet 9 is energized by a current of about two amperes. By means of the adjustable pole 15 the distance between the poles may be increased and the magnetic arc accordingly diminished. By means of the hinge 13 the lower pole of the magnet may be dropped so as to exert no influence upon the ore on the table. By this arrangement of the magnet 9 the strength of its magnetic arc can be adjusted to a nicety and without any change in the character or strength of the current producing the same. In specifying the forms and dimensions of magnets to be employed I mean to approximate them only, bearing in mind that different kinds of iron and steel differ in magnetic saturative capacity, and therefore it is impossible to determine precisely the strength of a magnetic arc merely by the form and dimensions of the magnet. The directions given, however, are sufficient to enable one, with the exercise of ordinary skill and intelligence, to practice my invention to the best advantage.

I do not limit my invention to the use of any particular construction of magnetic separating-machine, but refer to the one invented by me as preferred and to enable me to describe the best method of practicing my process.

While I have found that the best results can be attained in concentrating ores by magnetic separation to employ a brief duration of heat, as before described, my invention is adapted to the concentration of ores by magnetic separation whatever may be the extent of heat to which they have been subjected in preparation therefor.

If the ore has been subjected to heat for a long while, it is impossible to obtain so good results in the separating process as when it is prepared by a brief heat, however carefully and intelligently the intensity of the magnetic arc may be adjusted; but in such cases of prolonged heat far better results can be attained by the adjustment and adaptation of the magnetic arc herein described than by any other means heretofore known and practiced.

While I have a theory of the operation by which sensibility to a magnet is imparted to silicates and other so-called "non-magnetic" materials, different opinions may be entertained concerning it, and I do not attempt to explain the same herein, as it is unnecessary for the purposes of this case. To whatever cause the same may be ascribed, the fact was discovered by me and is included within the scope of my invention.

In the practice of my invention the ore should be pulverized to about twenty mesh and fed into the hopper of the separating-machine, from which it falls upon the stationary chute or apron and from there upon the vibratory table, down which it slides, while thinly spread over the same, and is kept in a lively state by means of the movement of the table and passes under the belt 10, to which the magnetic particles are attracted by means of the magnet 6, located above the same, and are carried thereby beyond the field of the magnet and discharged into a suitable receptacle. The magnet 6 has a magnetic arc of about one-half ampere and removes but a part of the magnetic portion of the ore. The ore continues to slide down the table under the second belt 11, above which is the magnet 7, the strength of whose magnetic arc is about one ampere. A deposit of some of the magnetic material which has escaped the first magnet is made upon the belt 11 and by it carried beyond the field of the magnet and discharged into a receptacle. The ore left upon the table continues to slide down the same and passes beneath the belt 12, above which is located the upper pole 8 of the magnet 9, whose magnetic arc is produced by a current of about two amperes, with poles arranged in close proximity, as shown, which removes the magnetic particles of the ore that have escaped the action of the first two magnets. The strength of the magnetic arcs in the arrangement described is adapted to produce the best results upon ore which has been subjected to the least exposure to heat that is adequate to suitably magnetize the iron—that is, for a few seconds of red heat. The concentrates of the magnetic portion of the ore removed by the magnets are then assayed, and if found to contain too large a percentage of silicates and other non-magnetic materials another specimen of the same ore is passed through the separating-machine, but with a current of less amperage energizing the magnets, respectively, or by dropping the lower pole 15 of the magnet 9, so as to reduce the amperage of its magnetic arc. The products of this test are again assayed, and if a less percentage of silicates is found mingled with the concentrates than before and substantially all the values are found in the concentrates a third specimen is tested with a still lower amperage and the products assayed, and these experiments are repeated until the concentrates are found to contain the lowest percentage of zinc and other non-magnetic materials that is consistent with the removal of the largest percentage of iron and values combined therewith.

Take, for instance, an ore containing thirty-four per cent. of iron sulfid carrying gold, copper, silver, or other values, thirty-eight per cent. of zinc sulfid, and twenty-eight per cent. of lead, silicates, and other waste materials. I subject a specimen to red heat for thirty seconds. I then pass it through the separating-machine with the strength of current specified herein energizing the magnets and with the poles of the magnet 9 in close proximity, as shown in the drawings, and assay the products. If substantially all the iron is not removed, I then subject another specimen to red heat for a slightly-longer time and assay the products, and repeat these experiments as many times as may be necessary until the magnets remove essentially all the iron, say within one or two per cent. If then the iron and values removed carry with them any considerable percentage of zinc or silicates, I reduce the strength of the magnetic arc of the magnet 9 by adjusting the lower pole of the magnet farther from the upper pole and test another specimen. Such tests are repeated, each time increasing the distance between the poles of the magnet 9, until no appreciable amount of zinc or silicates is found with the iron, say not more than two to four per cent., so that the portion removed by the magnets will contain all the iron in the ore within one or two per cent. without any zinc or silicates that will materially affect its value, and all the zinc and silicates within two to four per cent. are excluded from the iron and values combined therewith. The zinc sulfid will be left in the best commercial condition, being essentially free from iron and retaining essentially all its original sulfur. Any well-known means of varying the strength of the magnetic arcs and other forms and arrangements of magnets may be employed for the purposes specified. As before stated, I employ the construction and arrangement of magnets described as the most convenient and economical.

In the case of most ores with which I am familiar little more than momentary red heat is required to suitably magnetize the iron, and exceedingly weak magnetic arcs accomplish the best commercial separation.

By using my separating-machine the individual particles of ore are brought more directly under the action of the magnetic field than in any process heretofore used and can be freely lifted from the table to the belt. This enables me to employ magnets of minimum strength, which is a saving in cost of construction and of energizing the same. The zinc, silicates, and other non-magnetic materials are not appreciably sensitized by so little exposure to heat, and the employment of magnets of so little intensity results in a nearly absolute exclusion of the non-magnetics and waste materials from the concentrates. For all practical purposes the separation of the iron and values combined therewith from the zinc, silicates, and waste materials in most ores is perfect.

The use of my process is attended with a saving of skilled labor and time in heating the ore and in expense of construction of magnets and of energizing the same.

What I claim, and desire to secure by Letters Patent, is—

1. The process of concentrating ores to remove a definite proportion of constituents capable of being rendered paramagnetic, consisting in heating said ores to render said constituents paramagnetic and passing the same through a magnetic field of a strength inversely proportioned to the degree of exposure to heat.

2. The process of concentrating ores to remove a definite proportion of constituents capable of being rendered paramagnetic consisting in heating said ores to render said constituents paramagnetic, without causing the removal of any substantial amount of any constituent other than water and passing the same through a magnetic field of a strength inversely proportioned to the degree of exposure to heat.

3. The process of concentrating ores to remove a definite proportion of constituents capable of being rendered paramagnetic, consisting in heating said ores to a red heat to render said constituents paramagnetic and passing the same through a magnetic field of a strength inversely proportioned to the degree of exposure to heat.

4. The process of concentrating ores to remove a definite proportion of constituents capable of being rendered paramagnetic, consisting in heating said ores to a red heat to render said constituents paramagnetic without causing the removal of any substantial amount of any constituent other than water and passing the same through a magnetic field of a strength inversely proportioned to the degree of exposure to heat.

5. The process of concentrating ores to remove a definite proportion of constituents capable of being rendered paramagnetic, consisting of heating said ores for a brief time to render said constituents paramagnetic and passing the same through a magnetic field of a strength inversely proportioned to the time of exposure to heat.

6. The process of concentrating ores to remove a definite proportion of constituents capable of being rendered paramagnetic, consisting in heating said ores for a brief time to render said constituents paramagnetic without causing the removal of any substantial amount of any constituent other than water and passing the same through a magnetic field of a strength inversely proportioned to the time of exposure to heat.

7. The process of concentrating ores to remove a definite proportion of constituents capable of being rendered paramagnetic, consisting of heating said ores to a red heat for a brief time to render said constituents paramagnetic and passing the same through a magnetic field of a strength inversely proportioned to the time of exposure to heat.

8. The process of concentrating ores to remove a definite proportion of constituents capable of being rendered paramagnetic, consisting of heating said ores to a red heat for a brief time to render said constituents paramagnetic without the removal of any substantial amount of any constituent other than water and passing the same through a magnetic field of a strength inversely proportioned to the time of exposure to heat.

Dated this 13th day of August, A. D. 1902.

HENRY F. CAMPBELL.

Witnesses:
  CHAS. F. PERKINS,
  A. G. SULLIVAN.